June 9, 1931.　　　L. J. DAVIS　　　1,809,745
BRAKE SHOE HOLDER
Filed Sept. 12 1928　　2 Sheets-Sheet 2
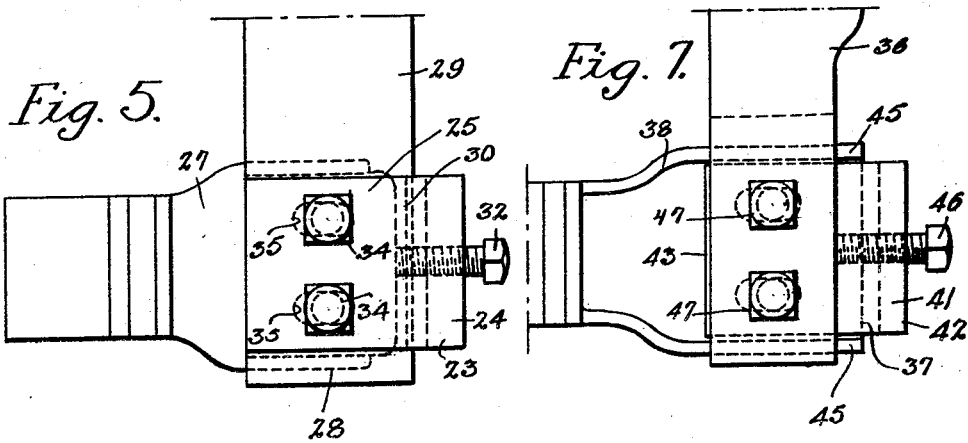
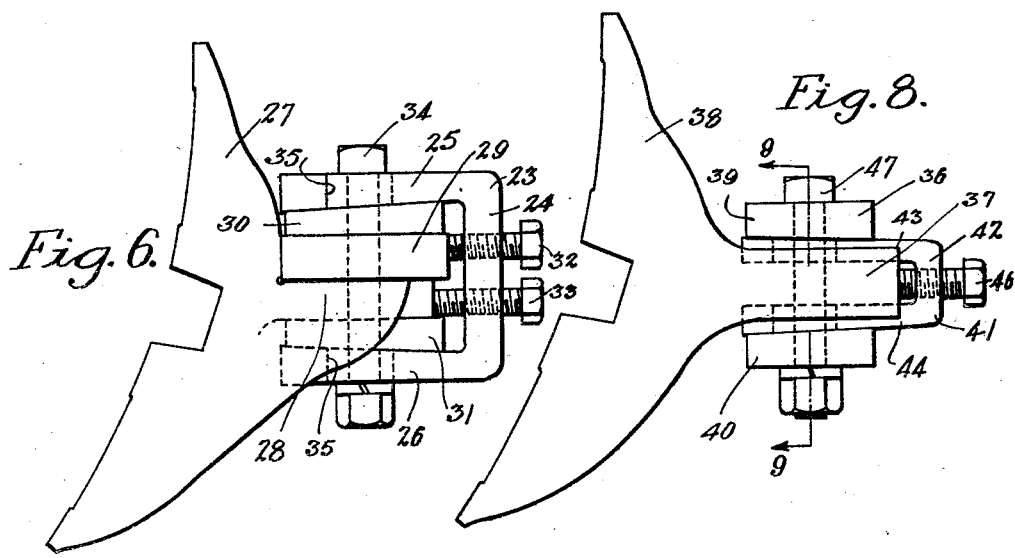
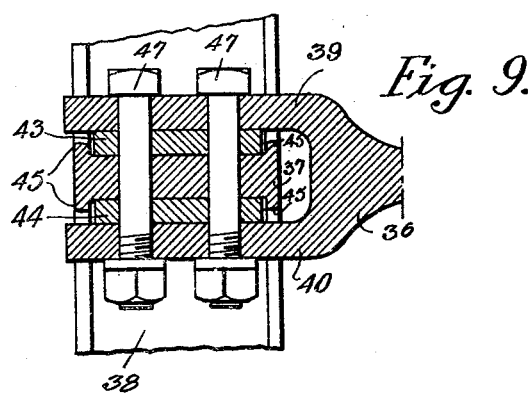
Inventor—
Lewis J. Davis
by his Attorneys
Howson + Howson Patented June 9, 1931

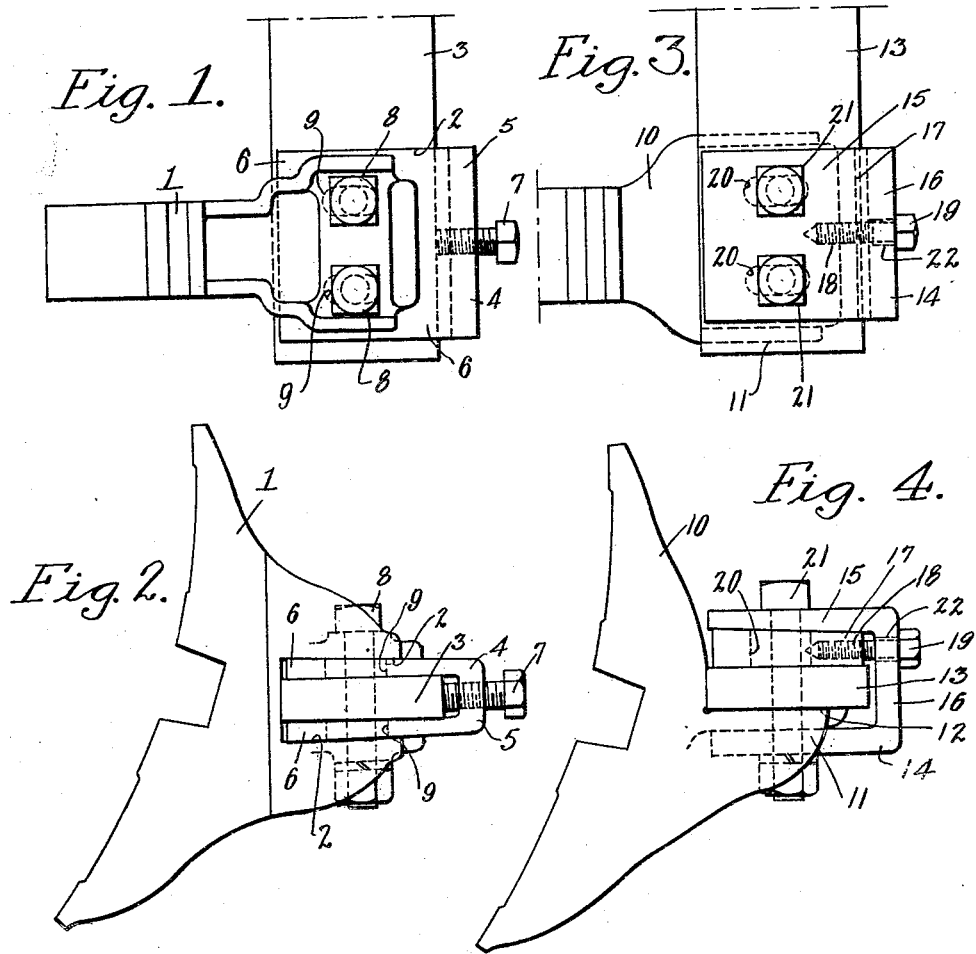

1,809,745

UNITED STATES PATENT OFFICE

LEWIS J. DAVIS, OF BROOKLYN, NEW YORK

BRAKE SHOE HOLDER

Application filed September 12, 1928. Serial No. 305,509.

This invention relates to means for tightly retaining a brake-shoe on a brake beam and is more particularly concerned with wedge-shaped means for bringing about such an engagement.

In the drawings in which are illustrated several modifications of the broad idea:

Fig. 1 is a top plan view, and Fig. 2 is a side elevation of one form of my invention;

Fig. 3 is a top plan view, and Fig. 4 is a side elevation of another form of the invention;

Fig. 5 is a top plan view, and Fig. 6 is a side elevation of still another modification;

Fig. 7 is a top plan view, and Fig. 8 is a side elevation of yet another modification, while Fig. 9 is a sectional view taken on the line 9—9 of Fig. 8.

At 1 is shown the brake-shoe head which is provided with a tapered opening 2 in the backside thereof. The brake beam 3 is inserted through said opening and is secured in position by means of a yoke 4 having a closed end or head 5 and double tapered legs 6. Through the closed end 5 is inserted an adjusting bolt 7 of any suitable form, the head 5 being threaded for the reception thereof. As will be readily understood, there may be any number of bolts 7 that is found desirable. Lock bolts 8 are inserted through transversely arranged openings in the brake-shoe head and the brake beam and through slots 9 in the legs 6. As will be readily perceived, the shoe head is placed on the brake beam 3 and the yoke 4 is then slipped over the brake beam and moved sideways into the space between the brake beam and the slot 2 in the shoe head.

The two bolts 8, which of course, may be of any desired number, are then put in place and slightly tightened. At this time, the adjusting bolt 7 is tightened up, pulling the tapered legs of the yoke 4 into place and thus tightening the shoe head on the brake beam. After this is done, the two bolts 8 are thoroughly tightened.

The shoe head will be held in place in the tapered hole 2 against torsional strains by the tapered legs 6, the bolts through the brake beam only serving to locate the shoe head on the brake beam and to prevent the shoe head from falling on the roadway if, through accident, the shoe head is broken.

The tapered yoke, with its adjusting bolt provides a simple and effective means of tightening the shoe head on the beam if due to inaccuracies of the machined surfaces or extreme distortion, the initial wedging effect of the tapered yoke is lost. The modification shown in Figs. 3 and 4 employs the same basic principle as that just described, but differs from somewhat, in detail.

At 10 is shown the brake-shoe head which terminates in a rearwardly extending lug portion 11 having a plane surface 12 which engages the brake beam 13. A yoke 14 having a tapered leg 15 and a head 16 is located around the lug portion 11 and brake beam 13, the leg 15 being spaced from the brake beam by the intermediary of a tapered wedge 17. This wedge is threaded at 18 for the reception of an adjusting bolt 19 and is slotted as at 20 for the reception of locking bolts 21. In this modification, the opening 22 in the head 16 for the reception of bolt 19, need not be threaded, inasmuch as the bolt is threaded into the wedge 17.

The method of adjusting this modification is similar in its essential features to the form shown in Figs. 1 and 2.

In Figs. 5 and 6, there is employed a yoke 23 having a head 24, and tapered legs 25 and 26, along with a brake-shoe head 27 provided with a rearwardly-extending lug portion 28, which lug portion is flat on its upper surface, and is gripped firmly against the brake beam 29 by means of tapered wedges 30 and 31 interposed between the said tapered legs. Adjusting bolts 32 and 33 are threaded through the head 24, abutting against the brake beam 29 and an offset portion of lug 28, respectively, to draw the yoke 23 into positive engagement with said wedges, and thus grip the shoe 27 firmly against the brake beam 29. The usual locking bolts 34 are provided, which ride in slots 35 of the legs 25 and 26.

In the form shown in Figs. 7–9, the brake beam 36 is forked at its end which engages the lug portion 37 of the brake-shoe head 38, and is thus provided with arms 39 and 40. A yoke 41 is provided, having a head 42 and tapered legs 43 and 44. The legs 43 and 44 are slid between the arms 39 and 40 and the lug 37, which lug is provided along the longitudinal extremities of both surfaces with upstanding flanges 45. By means of one or more bolts 46, the yoke 41 is firmly wedged against the tapered arms 39 and 40 of the forked brake beam 36. In this manner, the brake-shoe head is firmly secured in position and at this time lock bolts 47 which extend through the brake beam, yoke, legs and lug 37 may be tightened to hold the elements in their assembled relation.

As will be readily understood, the invention is susceptible to numerous modifications, and it is intended that it be limited only by the scope of the appended claims.

I claim:

1. In combination, a brake-shoe head having a rearwardly-extending portion, a brake beam, a wedge-shaped means for securing said rearwardly-extending portion to said brake beam, adjusting means for said wedge-shaped means and means for securing said brake beam, said wedge-shaped means, and said rearwardly-extending means in their assembled position.

2. In combination, a brake-shoe head having a rearwardly-extending portion in which there is a tapered opening, a brake beam extending through said opening, wedge-shaped means extending through said opening and adjusting means for causing said wedge-shaped means to secure the brake-shoe head against said brake beam, and means extending through said head, said brake beam and said wedge to fix them in their assembled position.

3. In combination, a brake-shoe head having a rearwardly-extending portion in which there is a tapered opening, a brake beam extending through said opening, a yoke member having a head and double tapered arms, said arms extending through said opening and surrounding said brake beam, adjusting means extending through said head and abutting said brake beam, the said adjusting means permitting the yoke to be drawn up so that its tapered arms firmly engage the brake beam and the brake-shoe head, and locking bolts extending transversely through said brake-shoe head, said tapered arms, and said brake beam, for fixing them in their assembled relation.

4. In combination, a brake-shoe head having a rearwardly-extending lug member, a beam member, a yoke straddling at least one of said members and having wedging co-action with said members to bind them against relative movement, means for adjusting and means for securing the yoke against movement with relation to said members.

5. In combination, a brake-shoe head having a rearwardly-extending lug member, a beam member, a yoke straddling at least one of said members and having wedging co-action with said members to bind them against relative movement, means for adjusting and means for securing the yoke against movement with relation to said members, one of said members having a slot, the other member extending into said slot, the arms of the yoke extending into said slot at opposite sides of the first-named member.

6. In combination, a brake shoe head having a rearwardly extending portion, a brake beam flatly confronting said rearwardly extending portion, and an adjustable wedge-shaped means for securing said brake shoe head against said brake beam.

7. In combination, a brake shoe head having rearwardly extending lug, a brake beam associated with said lug, a wedge shaped member engaging the lug and said brake beam, a yoke member straddling the beam, wedge-shaped member and lug, said yoke member having a tapered leg engaging said wedge-shaped member and means for shifting the yoke member to tightly clamp the wedge-shaped member, the brake beam and the lug in assembled relation.

8. In combination, a brake shoe head having rearwardly extending lug, a brake beam associated with said lug, a wedge shaped member engaging the lug and said brake beam, a yoke member straddling the beam, wedge-shaped member and lug, said yoke member having a tapered leg engaging said wedge-shaped member and means for shifting the yoke member to tightly clamp the wedge-shaped member, the brake beam and the lug in assembled relation and locking means extending through said yoke, said wedge-shaped member, said brake beam and said lug, for fixing them in the assembled relation.

9. In combination, a brake-shoe head having a rearwardly-extending, multiple faced lug portion, a brake beam engaging said upper face, a tapered wedge engaging said lower face, a similar tapered wedge engaging the opposite face of said brake beam, a yoke member having tapered arms engaging the exterior faces of said tapered wedges, adjusting bolts for drawing up the yoke member to tightly secure the wedges, the brake beam, and the lugs in their assembled relation, and locking means extending through said yoke, said wedges, said brake beam and said lug for fixing them in their assembled relation.

10. In combination, a brake-shoe head having a rearwardly-extending, multiple faced lug portion, a brake beam engaging said upper face, a tapered wedge engaging said lower face, a similar tapered wedge engaging the opposite face of said brake beam, a yoke member having tapered arms engaging the exterior faces of said tapered wedges, and adjusting bolts for drawing up the yoke member to tightly secure the wedges, the brake beam, and the lugs in their assembled relation.

11. In combination, a brake-shoe head having a rearwardly-extending lug portion, upstanding flanges along the longitudinal extremities of both faces of said lug portion, a brake beam terminating in a forked head, the arms of which transversely surround said lug, a yoke member having tapered legs, said legs extending between said lug and said arms, and adjusting means for drawing up said yoke member to firmly secure said lug and said brake beam.

12. In combination, a brake-shoe head having a rearwardly-extending lug portion, upstanding flanges along the longitudinal extremities of both faces of said lug portion, a brake beam terminating in a forked head, the arms of which transversely surround said lug, a yoke member having tapered legs, said legs extending between said lug and said arms, adjusting means for drawing up said yoke member to firmly secure said lug and said brake beam, and locking means extending through said brake beam, said lug and said yoke member for fixing them in their assembled relation.

LEWIS J. DAVIS.